US007062150B1

(12) United States Patent
Wugofski

(10) Patent No.: US 7,062,150 B1
(45) Date of Patent: Jun. 13, 2006

(54) SYSTEM AND METHOD FOR REMINDING USERS OF UPCOMING SCHEDULED RECORDINGS

(75) Inventor: Theodore D. Wugofski, Fort Worth, TX (US)

(73) Assignee: Gateway Inc., Irvine, TX (US)

( * ) Notice: Subject to any disclaimer, the term of this patent is extended or adjusted under 35 U.S.C. 154(b) by 571 days.

(21) Appl. No.: 09/002,600

(22) Filed: Jan. 5, 1998

(51) Int. Cl.
*H04N 5/91* (2006.01)

(52) U.S. Cl. .......................... 386/83; 386/125; 725/58

(58) Field of Classification Search ................. 386/46, 386/83, 125; 360/27, 72.2; 348/564, 569, 348/570, 906; 725/58; 455/3.03–3.06
See application file for complete search history.

(56) References Cited

U.S. PATENT DOCUMENTS

| 4,706,121 | A | * | 11/1987 | Young | 386/83 |
| 4,963,994 | A | * | 10/1990 | Levine | 386/83 |
| 5,047,867 | A | * | 9/1991 | Strubbe et al. | 386/83 |
| 5,467,197 | A | * | 11/1995 | Hoff | 386/83 |
| 5,699,107 | A | * | 12/1997 | Lawler et al. | 725/58 |
| 5,805,763 | A | * | 9/1998 | Lawler et al. | 386/83 |
| 6,275,268 | B1 | * | 8/2001 | Ellis et al. | 348/564 |

FOREIGN PATENT DOCUMENTS

EP 0682452 11/1995

* cited by examiner

*Primary Examiner*—Robert Chevalier
*Assistant Examiner*—Christopher Onuaku
(74) *Attorney, Agent, or Firm*—Ross F. Hunt, Jr.; Stites & Harbison PLLC

(57) ABSTRACT

Many home entertainment systems include a video cassette recorder or other recording device that has an automatic recording feature. The automatic recording feature, which automatically starts a scheduled recording without user intervention, may start recording without enough recording tape to complete the scheduled recording or may inadvertently over-record a one-of-a-kind recording of a birth, marriage, or graduation. Accordingly, one embodiment of the present invention includes a receiver for receiving a channel signal which carries a plurality of programs; a recording device for recording one of the programs; and an output device for outputting a reminder signal before the recording device begins recording the one program. In preferred embodiments, the output device includes a reminder database for storing a remind time that determines when the reminder signal is output, and the reminder signal provides a message concerning recording media. Thus, the present invention prevents the loss of data recording opportunities, but also guards against over-recording one-of-a-kind recordings.

17 Claims, 3 Drawing Sheets

SYSTEM AND METHOD FOR REMINDING USERS OF UPCOMING SCHEDULED RECORDINGS

FIELD OF THE INVENTION

The present invention pertains to home entertainment systems, particularly home entertainment systems that feature scheduled recording of video programs or programming events.

BACKGROUND OF THE INVENTION

The home electronics industry, in the midst of an on-going convergence of televisions and computers, has produced a new class of products, known as PC-TV systems, or personal-computer-television systems. In their simplest form, these systems allows a user to selectively switch between using a video monitor to watch television or to support computer activities, like word processing, creating spread sheets, playing computer games, or even surfing the world wide web. A seminal example, the Gateway Destination PC-TV system from Gateway 2000, Inc., not only weds a television to a personal computer, but allows system expansion to include satellite receivers and video-cassette recorders (VCRs).

Destination and other such systems additionally include an automatic recording feature which allow users to instruct VCRs to automatically record specific upcoming television programs, days, weeks, or even months before they actually occur. The instructions typically designate a channel, a start time, and an end time, and the systems log, or register, the instructions, for future execution. Once registered, the systems automatically select the designated channels and begin and end recordings at the designated times.

Although this feature provides a wonderful convenience for users, it also creates a high likelihood that users will forget previously-logged recording instructions, which in turn can cause several problems for users. For example, a user may load a video cassette without enough "room" to record an entire program or even forget to load any cassette at all. Thus, the system will be unable to execute a registered recording instruction, resulting in partial or complete loss of a recording opportunity. Additionally, users often forget to remove rewound video cassettes from their VCRs and inadvertently allow their systems to automatically record over priceless, one-of-a-kind recordings of births, marriages, graduations, etc.

SUMMARY OF THE INVENTION

To address these and other shortcomings, the present invention provides a method and system of reminding users about scheduled recordings. Specifically, one embodiment of the method entails scheduling a data recording for a specific time, and then outputting a reminder signal before the specific time of the data recording. In other embodiments, the method outputs a reminder signal concerning recording media and allows a user to cancel the data recording after the reminder signal is output.

One embodiment of the system includes a receiver for receiving a channel signal which carries a sequence of programs, a recording device for recording one of the programs, and an output device for outputting a reminder signal. In preferred system embodiments, the recording device includes a video-cassette recorder, and the output device includes a computer and a display.

The reminder method and system of the present invention is particularly useful in reminding users to load recording devices, such as video cassette recorders, with sufficient tape to record an entire program, thereby preventing the sometimes costly loss of a recording opportunity. Additionally, the reminder method and system safeguards against over-recording of one-of-a-kind recordings of births, marriages, graduations, etc., which users may inadvertently leave in a recording device.

Other embodiments, aspects and advantages of the invention will become apparent after considering the accompanying drawings and the following detailed description.

BRIEF DESCRIPTION OF THE DRAWINGS

The present invention is described with reference to three accompanying drawings. In the drawings, or figures, like reference numbers indicate identical or functionally-similar elements. Additionally, the left-most digit of each reference number identifies the figure where each reference number first appears.

DESCRIPTION OF THE PREFERRED EMBODIMENTS

Figure 1:
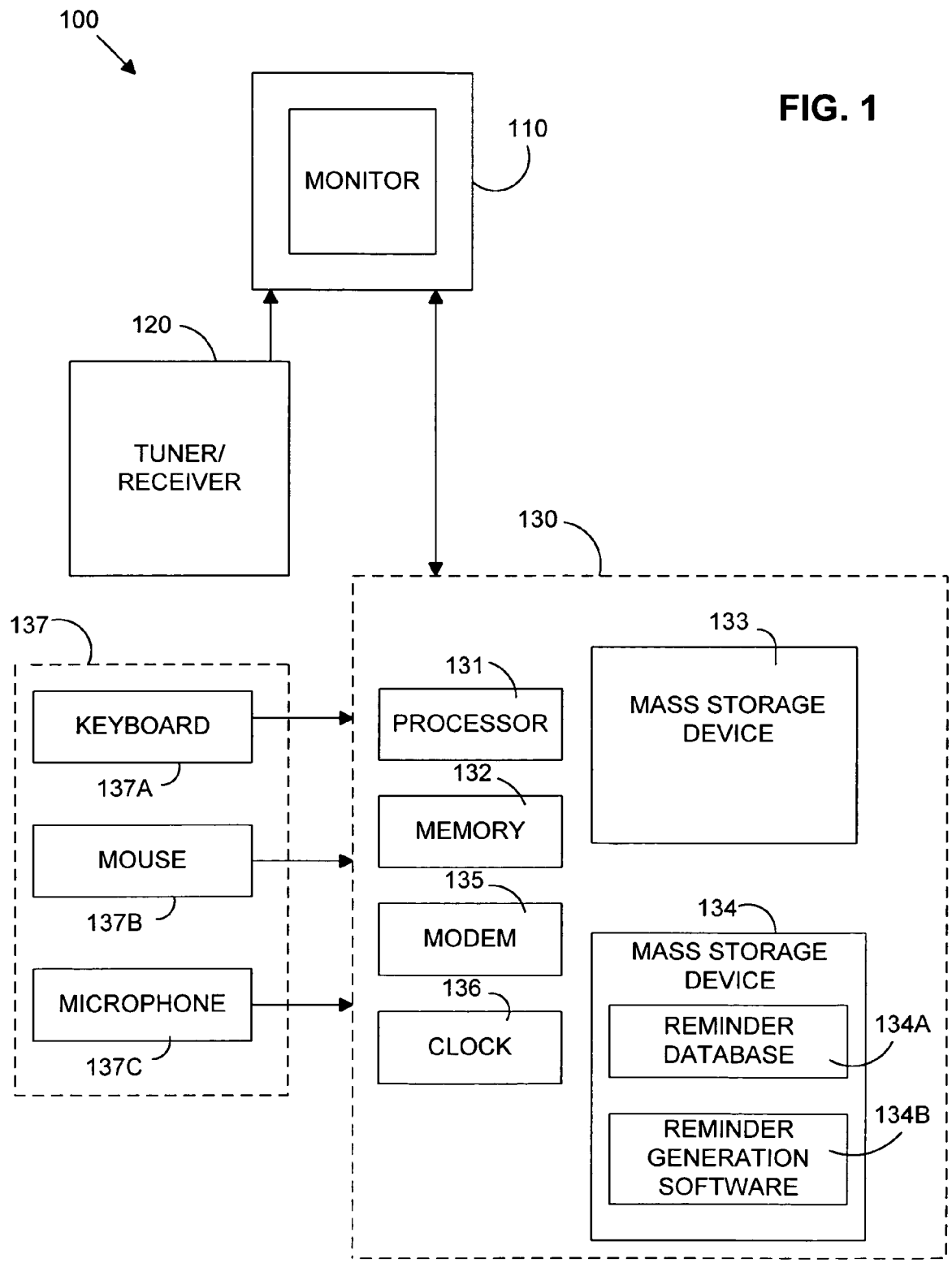
FIG. 1 is a diagram of a PC-TV system incorporating the invention.
Figure 2:
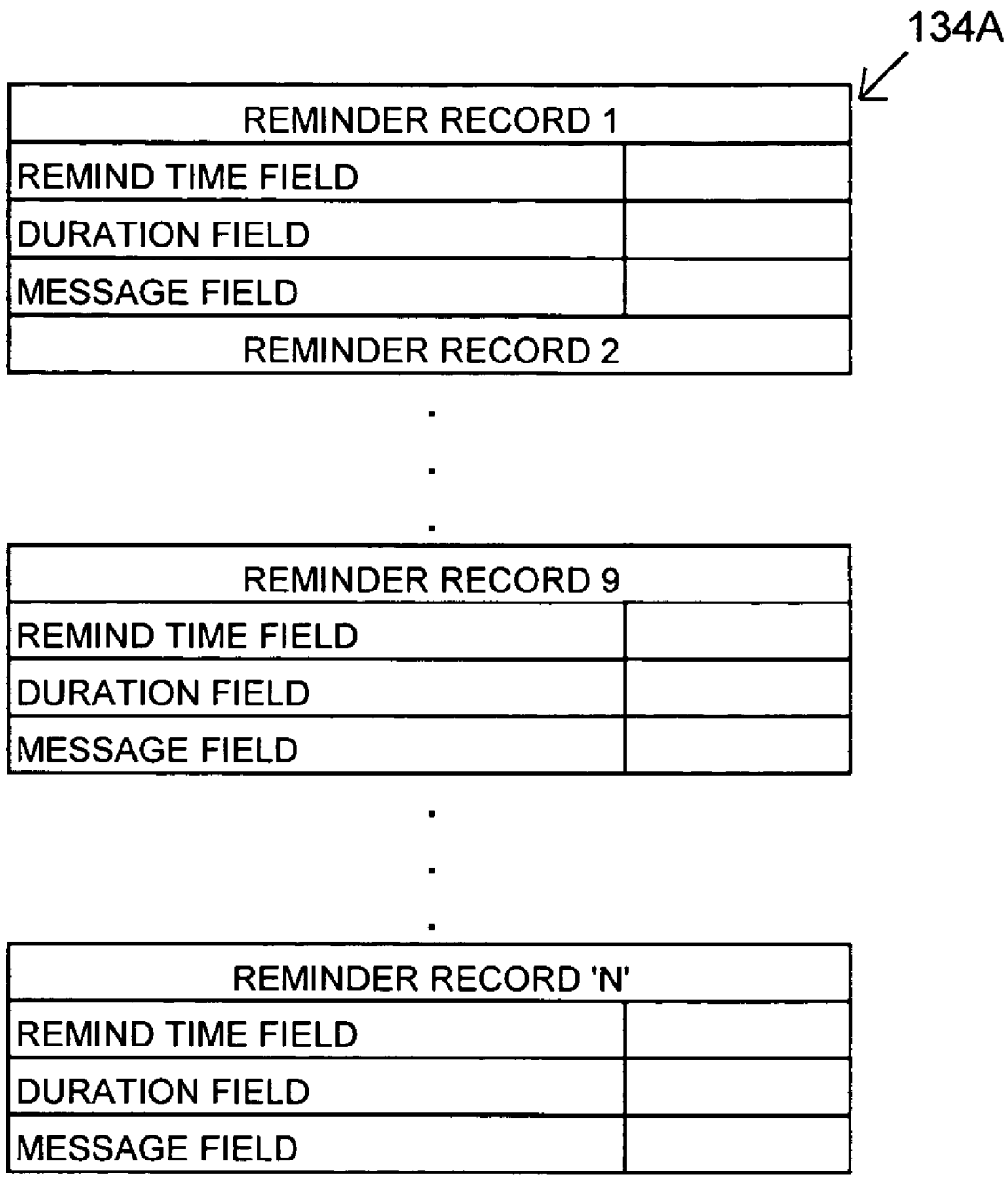
FIG. 2 is a table illustrating a data structure for a reminder database feature of the PC-TV system.
Figure 3:
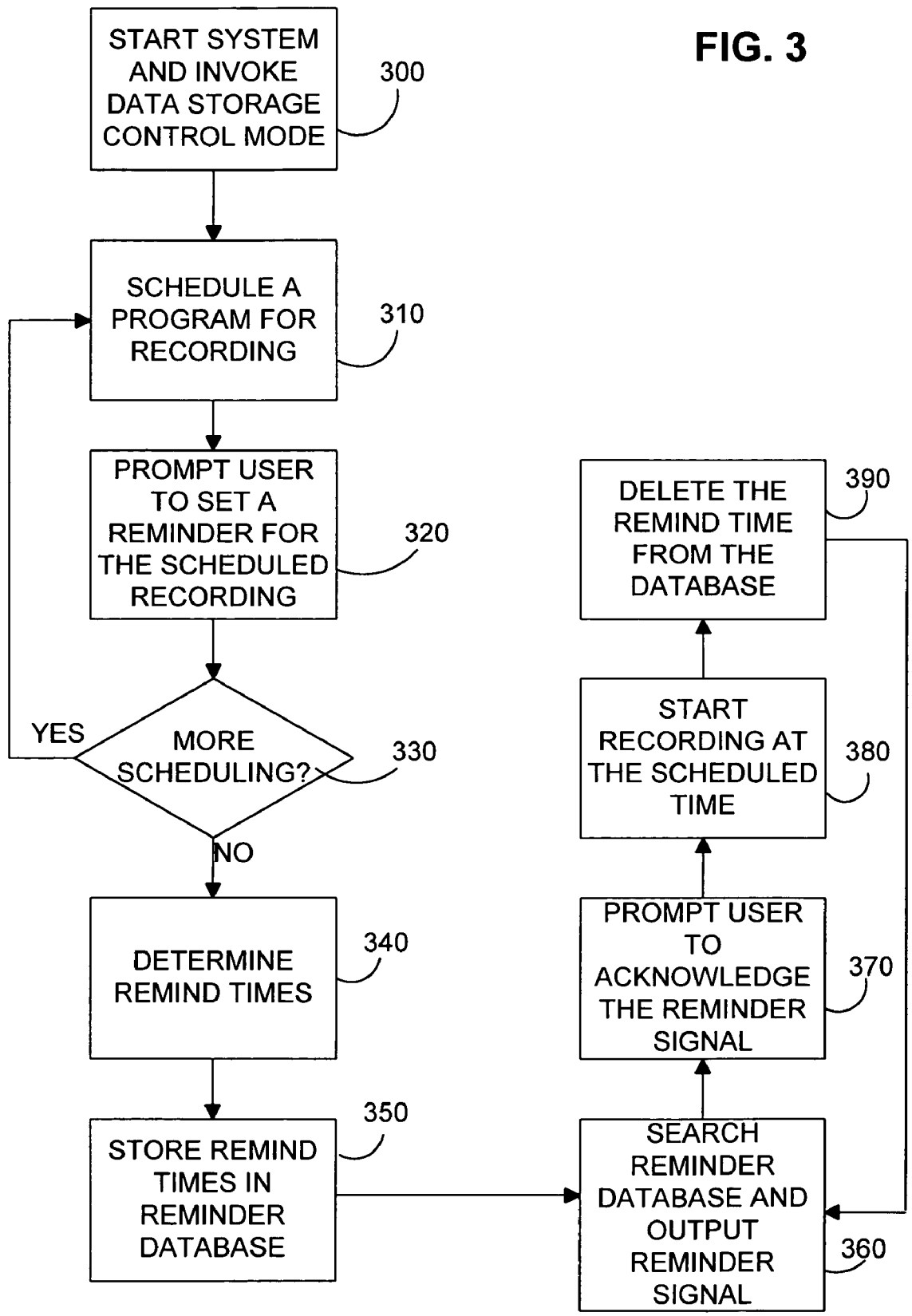
FIG. 3 is a flowchart of a method incorporating the invention.

The following detailed description, which references and incorporates FIGS. 1–3, describes and illustrates specific preferred embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

FIG. 1 shows a new PC-TV (or convergence) system 100, which includes a reminder database and related reminder-generation software. Specifically, PC-TV system 100, which preferably incorporates all features of the Destination PC-TV system from Gateway 2000, Inc. of North Sioux City, S. Dak., includes a monitor 110, a tuner-receiver 120, a personal computer 130, and a recording device 140.

Monitor 110, the heart of the system from a user perspective, displays video programming from tuner-receiver 120 or personal computer 130. Monitor 110 also includes built-in audio speakers (not shown) for outputting audible signals. In the preferred embodiment, the monitor provides a super-VGA display format.

Tuner-receiver 120 receives audio or video or digital data signals via direct connection or wireless coupling to a multi-channel programming source. The signals for a given channel carry a scheduled sequence of programs, or programming events. The preferred embodiment, tuner-receiver 120 accepts cable television signals, local over-the-air broadcast signals, and direct satellite television signals.

Computer 130, operatively coupled to monitor 110 and tuner-receiver 120, includes a processor 131, a local memory 132, mass-data-storage devices 133 and 134, a modem 135, a clock 136, and a set of user interface devices 137. Interface devices 137 include a keyboard 137A, a mouse or other pointing device 137B, and a microphone 137C, all of which support user interaction with a graphical user interface, preferably a version of Microsoft Windows.

Mass data-storage device 133, preferably a computer-controllable video cassette recorder (VCR) or other recording device, records audio, video, or digital data on a replaceable read-write, data-storage medium, such as a magnetic recording tape. However, the invention encompasses any device capable of recording and storing audio, video, or digital data.

Mass-data-storage device 134, which preferably includes a hard drive, stores a reminder database 134A which stores timing data governing the output of reminder signals. FIG. 2 shows details of the preferred embodiment of the database, which comprises a number of reminder records. Each record includes a remind-time field which governs when a particular reminder occurs. In other embodiments, the record also includes a duration field which specifies the length of time of the scheduled recording, and a message field which lists a particular reminder message to be output.

Storage device 134 also includes reminder-generation software 134B which cooperates with reminder database 134A. Software 134B operates within a broader software architecture which controls numerous other functions and services of PC-TV system 100. For example, the software may operate within the software architecture disclosed in co-pending, co-assigned and co-filed patent application "Architecture for Convergence Systems," which has the same assignee and filing date as the present application and which is hereby incorporated by reference.

When executed, reminder-generation software 134B causes system 100 to operate according to the preferred method illustrated in FIG. 3. The method begins at step 300 with a system user starting system 100 and invoking a data-storage control mode for data-storage device 133.

Step 310 entails scheduling a recording session to begin and end at specific times. In the preferred embodiment, the system user enters a data channel identifier, a date, a start time, and an end time into the system using keyboard 133A. The data channel identifier may identify a television channel or in fact any communication channel that carries recordable data. In other embodiments, this scheduling step references an electronic program guide or other database of channel program schedules.

Step 320 allows the system user to set a reminder for the scheduled recording event. Specifically, the system prompts the user to decide not only whether the system will output a reminder signal for the scheduled recording event, but also when the reminder will occur. In the preferred embodiment, the system default is to provide a reminder signal one hour before the recording event. The user can override the reminder signal altogether or establish another time interval. For example, the user may prefer to have 24-hours notice of the recording event to buy new recording media, for example, a blank video cassette.

In step 330, the system prompts the user to schedule additional recording sessions. The sequence of steps 310–330 allows the user to define a unique remind interval for each recording session. Thus, for example, the user could define a 24-hour remind interval for one recording session and 2-hour remind session for another recording session. If the users has no more recording session to schedule, the system proceeds to step 340.

In step 340, the system determines remind times based on the recording instructions (scheduled recordings) and their respective remind intervals. In the preferred embodiment, this entails subtracting each remind interval from the start time of its respective recording session.

In step 350, the system stores these remind times in reminder database 133A. In the preferred embodiment, this storing entails adding the remind times to the database and then sorting the database chronologically to list the earliest remind times first.

In step 360, the system outputs a reminder signal at a predetermined time before the time of the data recording. In the preferred embodiment, this entails searching the reminder database for the earliest reminder time and comparing this to the current system time provided by clock 135. Because of sorting in the preferred embodiment, the first listed remind time will always be the earliest; so searching reduces to selecting the first listed remind time.

If the earliest reminder time matches the current system time, the system outputs the reminder signal. In one embodiment, the reminder signal a verbal and a textual message, both indicating not only that a recording session has been scheduled, but also its start and end time. In another embodiment, which recognizes the mobility and active lives of system users, the system pages or telephones a user with a reminder signal. The preferred embodiment outputs both a loud high-pitched tone that last for 30 seconds while displaying the following flashing message on a portion of monitor 110:

RECORDING EVENT
10 PM WEDNESDAY, SEPTEMBER 24, 1999.
CHECK RECORDING MEDIA

In step 370, the system prompts the user to acknowledge receipt of the reminder signal recording and to allow the data recording session to proceed as scheduled or to cancel the data recording session. In step 380, assuming the user has not canceled the recording session, the system commands data-storage device 133 to start the recording session at the scheduled time.

In step 390, the system deletes the remind time for the recording session from reminder database 133A and returns to step 360 to determine the next remind time.

CONCLUSION

The present invention, a system and method of reminding users of upcoming recording events, solves the problem of users forgetting about previously-logged recording instructions, particular for video recording systems. More particularly, the system and method reminds users to load their VCRs or other recording devices with suitable recording media, thereby not only safeguarding highly-prized recordings of family events, such as births, marriages, and graduations, from inadvertent over-recording, but also ensuring that the recording devices have sufficient recording media to record an entire programming event.

The embodiments described above are intended only to illustrate and teach one or more ways of practicing or implementing the present invention, not to restrict its breadth or scope. The scope of the invention, intended to encompass all ways of practicing or implementing the invention, is defined only by the following claims and their equivalents.

The invention claimed is:

1. A method of operating a computerized system having a recording device for automatically recording data, the method comprising:

scheduling a data recording for the recording device, with the data recording to begin at a recording time;

receiving user input at least partially determinative of a recording reminder time for the scheduled data recording, with the user input being non-determinative of the recording time; and outputting a recording reminder signal at a time based on the recording reminder time, before the recording device initiates automatic execution of the scheduled data recording, said outputting of the recording reminder signal comprising outputting a message to at least one user of the computerized system via a mobile network communications device associated with at the least one user of the computerized system.

2. The method of claim 1, wherein scheduling a data recording for the recording device occurs before receiving user input at least partially determinative of a recording reminder time.

3. The method of claim 1, wherein outputting the reminder signal comprises outputting a message concerning the scheduled recording to a pager.

4. The method of claim 1 wherein outputting the reminder signal includes outputting a verbal message, a textual message, or an audible tone.

5. The method of claim 1, wherein outputting a reminder signal includes outputting a message concerning recording media.

6. The method of claim 1, wherein scheduling the data recording includes communicating a recording instruction to the computerized system, and wherein the method further comprises calculating and storing the recording reminder time based on at least the user input and at least a portion of the recording instruction before outputting the reminder signal.

7. The method of claim 6 wherein the recording instruction includes a channel identifier, a start time, and an end time.

8. The method of claim 1, wherein outputting a reminder signal at the predetermined time before the time of the data recording includes:

comparing a system time to the recording reminder time.

9. The method of claim 1, further comprising:

determining the recording reminder time based on the received user input, with the recording reminder time preceding the recording time for the scheduled recording by an amount of time based on the received user input.

10. A computerized entertainment system comprising:

a receiver for receiving one or more channel signals, each carrying one or more programs; a recording device, coupled to the receiver, for automatic recording one of the programs;

means for scheduling the recording device to begin automatic recording of the one program at a recording time;

means for receiving user input regarding a recording reminder, with the user input being non-determinative of the recording time;

means for determining a recording reminder time for at least the one program based on the recording time and the user input regarding the recording reminder;

an output device for outputting a reminder signal at the recording reminder time before the recording device initiates automatic recording of the one program; and means for causing the recording device to begin automatic recording of the one program independently of the determined recording reminder time, the output device including means for outputting the recording reminder signal as a message to at least one user of the computerized system via a mobile network communications device associated with the at the least one user of the computerized system.

11. The system of claim 10 wherein the output device comprises a computer and a display.

12. The system of claim 10 wherein the reminder signal includes a verbal message, a visible message, or an audible tone.

13. The system of claim 10 wherein the reminder signal includes a message concerning recording media.

14. A computer comprising reminder-generation software, the reminder-generation software comprising instructions for:

receiving user input at least partially determinative of a recording reminder time for a scheduled automatic data recording and non-determinative of a time for initiating the scheduled data recording, with the recording reminder time preceding a time of the scheduled automatic data recording by an amount of time based on the user input; and outputting a reminder signal at the recording reminder time before initiation of the scheduled automatic data recording, said reminder signal being outputted as a message to at least one user of the computer via a mobile network communication device associated with the at least one user of the computer.

15. The computer of claim 14, wherein the reminder-generation software instructions include instructions for including a message concerning recording media as part of the reminder signal.

16. A computer-readable medium comprising instructions for: scheduling a read-write data storage device to automatically record data at a future time; and receiving user input at least partially determinative of a recording reminder time and non-determinative of a time for initiation of the automatic recording, with the recording reminder time preceding the future time by an amount of time based on the user input; and outputting a recording reminder signal at the recording reminder time before the read-write data storage initiates automatic recording of the data, said reminder signal being outputted as a message to at least one user providing said user input via a pager associated with the at least one user.

17. A method of operating a computerized system having a recording device for automatically recording data during two or more scheduled recordings, the method comprising:

receiving two or more user remind-time inputs, with each user input being associated with at least one of the scheduled recordings and each user input being non-determinative of a time for initiation of an automatic recording and with at least two of the user remind-time inputs differing from each other;

defining two or more recording reminder times, with each of the recording reminder times associated with at least one of the scheduled recordings and based at least partially on the associated user remind-time input and with each of the recording reminder times preceding a respective time for initiation of its associated scheduled recording by amounts of time based on the respective remind-time input; and outputting recording reminder signals at each of the recording reminder times as a message to at least one user providing said user remind-time input, via a pager associated with the at least one user.

* * * * *